United States Patent
Furukawa

(10) Patent No.: US 9,091,222 B2
(45) Date of Patent: Jul. 28, 2015

(54) CONTROL METHOD OF PRECOMBUSTION CHAMBER TYPE ENGINE

(75) Inventor: Yuta Furukawa, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 993 days.

(21) Appl. No.: 13/203,704

(22) PCT Filed: Feb. 25, 2010

(86) PCT No.: PCT/JP2010/052918
§ 371 (c)(1),
(2), (4) Date: Sep. 12, 2011

(87) PCT Pub. No.: WO2010/098370
PCT Pub. Date: Sep. 2, 2010

(65) Prior Publication Data
US 2011/0308495 A1    Dec. 22, 2011

(30) Foreign Application Priority Data
Feb. 27, 2009    (JP) .................................. 2009-045483

(51) Int. Cl.
*F02B 19/00*    (2006.01)
*F02D 41/00*    (2006.01)
(Continued)

(52) U.S. Cl.
CPC .......... *F02D 41/0025* (2013.01); *F02B 19/108* (2013.01); *F02B 19/12* (2013.01);
(Continued)

(58) Field of Classification Search
CPC ..... Y02T 10/125; Y02T 10/123; Y02T 10/32; Y02T 10/47; Y02T 10/18; Y02T 10/44; F02B 19/12; F02B 2075/125; F02D 41/30; F02D 41/0025; F02D 41/0027; F02D 41/0042; F02D 41/0045; F02D 41/1454
USPC ............... 123/253, 259, 261, 90.15, 267, 275, 123/698, 699, 700; 701/103, 104, 105
See application file for complete search history.

(56) References Cited

U.S. PATENT DOCUMENTS 6,095,112 A * 8/2000 Glauber et al. ............... 123/275

FOREIGN PATENT DOCUMENTS

JP    4259640 A    9/1992
JP    4259651 A    9/1992
(Continued)

OTHER PUBLICATIONS

Decision to Grant a Patent mailed Aug. 6, 2013 corresponds to Japanese patent application No. 2011-501630.
International Preliminary Report on Patentability dated Sep. 13, 2011 (English Translation), issued in the corresponding PCT Application No. PCT/JP2010/052918.
(Continued)

*Primary Examiner* — Hai Huynh
*Assistant Examiner* — Raza Najmuddin
(74) *Attorney, Agent, or Firm* — Benjamin J. Hauptman; Manabu Kanesaka

(57) ABSTRACT

Providing a control method for controlling an engine of a precombustion chamber type, whereby the misfiring in the precombustion chamber is surely prevented. In the control method for controlling an engine of a premix combustion type, the method including, but not limited to the processes of: a first step where the charging air pressure, the charging air temperature and the engine speed are detected; a second step where the air excess ratio of the air fuel mixture supplied to the main combustion chamber is computed as per predetermined relational expressions; a third step where the amount of the fuel to be supplied to the precombustion chamber is duly computed as per the relational expression between the air excess ratio of the air fuel mixture in the main combustion chamber and the fuel amount of the air fuel mixture in the precombustion chamber; a fourth step where the valve opening duration regarding a precombustion chamber fuel supply valve for controlling the amount of the fuel to be supplied to the precombustion chamber is computed as per a relational expression between the valve opening duration and the computed fuel amount of the air fuel mixture in the precombustion chamber.

4 Claims, 6 Drawing Sheets

(51) Int. Cl.
 *F02B 19/10* (2006.01)
 *F02B 19/12* (2006.01)
 *F02D 41/14* (2006.01)
 *F02M 21/02* (2006.01)
 *F02D 19/02* (2006.01)

(52) U.S. Cl.
 CPC ......... *F02D 19/024* (2013.01); *F02D 41/1458* (2013.01); *F02M 21/0236* (2013.01); *F02M 21/0275* (2013.01); *F02M 21/0284* (2013.01); *F02D 2200/0406* (2013.01); *F02D 2200/0414* (2013.01); *Y02T 10/125* (2013.01); *Y02T 10/32* (2013.01)

(56) References Cited

FOREIGN PATENT DOCUMENTS

| | | |
|---|---|---|
| JP | 2004036424 A | 2/2004 |
| JP | 2005140040 A | 6/2005 |
| JP | 2006105161 A | 4/2006 |
| JP | 2006170212 A | 6/2006 |
| JP | 2007198140 A | 8/2007 |

OTHER PUBLICATIONS

International Preliminary Report on Patentability dated Aug. 30, 2011 (Japanese Language), issued in the corresponding PCT Application No. PCT/JP2010/052918.

International Search Report for PCT/JP2010/052918, mailed Mar. 30, 2010.

\* cited by examiner

CONTROL METHOD OF PRECOMBUSTION CHAMBER TYPE ENGINE

CROSS-REFERENCE TO RELATED APPLICATIONS

The present Application is the U.S. National Stage of International Application No. PCT/JP2010/052918, filed on Feb. 25, 2010, published in English; which Application claims priority benefit of Japanese Application No. 2009-045483, filed Feb. 27, 2009.

BACKGROUND OF THE INVENTION

1. Field of the Invention

The disclosure in this specification relates to a control method for controlling an engine having a precombustion chamber in which spark ignition is performed.

2. Background of the Invention

With regard to the engine having a precombustion chamber, it is been conventionally necessary to control the air fuel ratio of the gas guided into the precombustion chamber so that the ignition by the spark plug is satisfactory performed; thus, in a control method for controlling an engine having a precombustion chamber, the air fuel ratio of the air fuel mixture guide into the precombustion chamber is controlled (for instance, see Patent Reference 1). Incidentally, the air fuel ratio is the ratio of the air in mass to the fuel in mass in the air fuel mixture.

The air fuel ratio has to be kept at an appropriate level; otherwise, either air rich condition (an excessive air state) or fuel rich condition (an excessive fuel state) leads to misfiring of the engine. In addition, in view of exhaust gas emission, apart from the precombustion chamber, it is preferable to keep an appropriate air rich condition in the main combustion chamber.

FIG. 5 shows an example of a conventional engine of a precombustion chamber type. As shown in FIG. 5, a main combustion chamber S1 is formed over a piston 1; a precombustion chamber-forming piece 3 of a tapered shape is arranged on the head side of a cylinder 2. In the precombustion chamber-forming piece 3, a precombustion chamber S2 is formed. On the upper side of the precombustion chamber-forming piece 3, a spark (ignition) plug 4 is provided for igniting the air fuel-gas mixture in the precombustion chamber S2. Further, over the precombustion chamber-forming piece 3, a fuel gas supply pipe 5 for feeding the fuel gas is provided. On a part way of the fuel gas supply pipe 5, a precombustion chamber fuel supply valve 6 for regulating the flow amount of the fuel is provided.

Further, the space in the main combustion chamber on the head side of the cylinder 2 communicates with an air charging pipe 7 for charging fuel gas (or air fuel-gas mixture) into the main combustion chamber S1. An air intake valve 8 is provided at the boundary between the air charging pipe 7 and the cylinder 2, the boundary demarcating the space inside of the main combustion chamber S1 and the passage formed by the air charging pipe 7. On a part way of the air charging pipe 7, a fuel gas supply pipe 9 for making fuel gas stream into the air charging pipe 7 is connected to the air charging pipe 7. In addition, on a part way of the fuel gas supply pipe 9, a main fuel supply valve 10 for regulating the flow rate of the fuel toward the main combustion chamber S1 is provided. Further, the fuel gas supply pipe 9 communicates with the precombustion chamber S2 as well as communicates with the fuel gas supply pipe 5 connected to the precombustion chamber S2; namely, a fuel gas pipe branches into two passages (i.e. the fuel gas supply pipes 9 and 5); thereby, the fuel gas supply pipe 9 supplies fuel to the main combustion chamber S1, while the fuel gas supply pipe 5 supplies fuel to the precombustion chamber S2.

The air fuel-gas mixture streaming into the main combustion chamber S1 through the air charging pipe 7 burns in the main chamber 10, and produces combustion gas; the produced combustion gas is discharged as exhaust gas from the main combustion chamber 10 through an exhaust (gas discharging) pipe 11. An exhaust valve 12 is provided at the boundary between the air charging pipe 7 and the cylinder 2, the boundary demarcating the space inside of the main combustion chamber S1 and the passage formed by the exhaust (gas discharging) pipe 12.

The various valves such as the fuel supply valves 6 and 10 are controlled by ECU (an engine control unit) 13.

On the other hand, a part of lean air fuel mixture guided into the main combustion chamber S1 for main combustion streams into the precombustion chamber S2 via the main combustion chamber. In order to obtain an appropriate air fuel ratio of the air fuel-gas mixture guided into the precombustion chamber, fuel gas is supplied to the precombustion chamber via the precombustion chamber fuel supply valve 6. Hence, various approaches to regulate the appropriate air fuel ratio of the air fuel-gas mixture guided into the precombustion chamber S2 have been conventionally studied and developed (e.g. Patent References 2 and 3)

In one example of the studied and developed approaches for controlling the engines having a precombustion chamber, the fuel-gas flow toward the precombustion chamber is controlled in response to the engine operation conditions such as engine load conditions. In such an approach, however, when the engine load or the engine speed is increased abruptly, the air fuel ratio of the air fuel-gas mixture guided into the main combustion chamber may be transiently in shortage (i.e. the air fuel-gas mixture is transiently placed in a fuel rich condition); accordingly, the air fuel ratio of the air fuel-gas mixture guided into the precombustion chamber is placed in a fuel rich condition. Thus, misfiring may be caused in the precombustion chamber.

In the next place, the types regarding misfiring (i.e. how misfiring occurs) are hereby explained.

FIG. 6(a) shows how the air excess ratio (explained in the later description regarding embodiments) of the air fuel mixture in the precombustion chamber changes in response to the engine speed change. In FIG. 6(a), the solid line is a locus regarding the response of the air excess ratio of the air fuel mixture in the precombustion chamber with regard to the engine speed in a case where the engine speed is quasi-statically increased; thereby, the air excess ratio of the air fuel mixture in the precombustion chamber is not decreased and is kept in an equilibrium state, even though the engine speed is increased. In a case where the engine speeds up and the engine speed is abruptly increased, however, the quasi-static line connecting the points A and B bends downward so as to form an arc shape as shown with the broken line in FIG. 6(a). Even in this case, the broken line is out of the misfiring zone in FIG. 6(a). However, in a case where the engine speed is further abruptly increased, the locus regarding the response of the air excess ratio against the engine speed forms a dash-dot line connecting the points A and C so that the air excess ratio reaches the misfiring zone.

Further, on the basis of FIG. 6(a), FIG. 6(d) as well as FIG. 6(e) is explained. FIG. 6(e) shows the relation between the fuel amount supplied into the main combustion chamber and the engine speed; thereby, along the solid line (in a case where the engine speed is quasi-statically increased), the fuel amount in the main combustion chamber is linearly increased in response to the increase of the engine speed. In addition, along the broken line (namely, in a case where the engine speed is abruptly increased) in FIG. 6(e), the fuel amount in the main combustion chamber is further increased than in the case where the engine speed is quasi-statically increased; accordingly, the air excess ratio of the air fuel mixture in the main combustion chamber is decreased. As a result, the fuel amount in the air fuel mixture that streams into the precombustion chamber via the main combustion chamber is increased. Therefore, in this situation of the increased fuel amount in the precombustion chamber, if the fuel amount into the precombustion chamber is linearly controlled as shown in FIG. 6(b), the air excess ratio of the air fuel mixture in the precombustion chamber is decreased as shown in FIG. 6(a). Further, when the engine abruptly speeds up (namely, in a case of the dash-dot line), the misfiring is caused at the point C as described above, and the engine speed is decreased as shown in FIG. 6(e).

In a case where a misfiring is caused, the engine speed is decreased as described above; thus, in a case where the feedback control regarding the fuel amount supplied to the main combustion chamber is performed with regard to the engine speed, the amount of the fuel supplied to the main combustion chamber is increased in response to the decrease of the engine speed; thus, the misfiring is further inclined to happen, as shown in FIG. 6(a).

REFERENCES

Patent References

Patent Reference 1: JP2007-198140
Patent Reference 2: JP1992-259640
Patent Reference 3: JP1992-259651

SUMMARY OF THE INVENTION

Subjects to be Solved

In the control approach of the conventional engine having the precombustion chamber, however, the engine control is performed so that the intensity of the torch jets from the precombustion chamber is optimized according to the engine operation conditions; even when a transitory condition of the fuel excessiveness in the main combustion chamber appears, the fuel amount in the precombustion chamber becomes excessive (i.e. an excessively fuel-rich condition occurs); thus, the misfiring is caused in the precombustion chamber. Consequently, the engine speed or the engine output is decreased. In addition, in a case where a feedback control regarding the engine speed or the engine output is performed, the fuel rich state of the air fuel mixture in the main combustion engine further progresses, and it becomes further difficult to ignite the fuel air mixture. Thus, there may happen difficulties in which the engine stalls.

In view of the above-described difficulties in the conventional technologies, the present invention aims at providing a control method for controlling an engine of a precombustion chamber type so that the misfiring in the precombustion chamber is surely prevented.

Means to Solve the Subjects

The present invention is contrived in order to provide the means to overcome the above-described difficulties.

The present invention discloses a control method for controlling an engine of a precombustion chamber type, the engine comprising: a main combustion chamber; and a precombustion chamber; wherein fuel gas is supplied to the main combustion chamber and the precombustion chamber, the control method comprising increasing or decreasing an amount of fuel to be supplied to the precombustion chamber in response to an air excess ratio of an air fuel mixture supplied to the main combustion chamber, thereby keeping the air fuel ratio of in the precombustion chamber at an appropriate level.

According to the above, the engine operation conditions are measured in time intervals of a short time span; the air fuel ratio of the air fuel mixture in the precombustion chamber is regulated so that the air fuel ratio is kept at an appropriate level; thus, the misfiring that may possibly occur in the precombustion chamber can be surely prevented.

A preferable embodiment of the above-described disclosure is the control comprising decreasing the amount of the fuel to be suppled to the precombustion chamber while the amount of the fuel to be supplied to the main combustion chamber is transiently increased.

According to the above, when the fuel amount toward the main combustion chamber is transiently decreased, the fuel amount toward the precombustion chamber is increased; thus, the air fuel ratio of the air fuel mixture in the precombustion chamber is regulated so that the air fuel ratio is kept at an appropriate level.

Another preferable embodiment is the control method, the method comprising a first step for detecting a charging air pressure, a charging air temperature and an engine speed; a second step for computing the air excess ratio of the air fuel mixture supplied to the main combustion chamber; a third step for computing the amount of the fuel to be supplied to the precombustion chamber as per a relational expression between the air excess ratio of the air fuel mixture in the main combustion chamber and the fuel amount of the air fuel mixture in the precombustion chamber; and a fourth step for increasing and decreasing the amount of the fuel to be supplied to the precombustion chamber on the basis of the valve opening duration regarding a precombustion chamber fuel supply valve, the valve opening duration being computed in response to the amount of the fuel to be supplied to the precombustion chamber.

According to the above, the opening duration regarding the main fuel supply valve is a control command variable which value is issued by ECU, and an already known value is used for the valve opening duration control; a simple manner can be applied so that the charging air pressure, the charging air temperature and the engine speed are detected as per a previously prepared relational expression between the air excess ratio of the air fuel mixture in the main combustion chamber and the fuel amount of the air fuel mixture supplied to the precombustion chamber. In this way, the misfiring in operating the engine can be prevented.

In the present invention, the charging air pressure, the charging air temperature and the engine speed are continuously and repeatedly measured; and, the control order value for the valve opening duration regarding the precombustion chamber fuel supply valve can be continuously outputted; thus, the air fuel ratio of the air fuel mixture in the precombustion chamber can be always duly maintained during the operation of the engine.

Effects of the Invention

According to the present invention, in the control method for controlling the engine of a precombustion chamber type, potential misfiring in the precombustion chamber can be surely prevented.

BRIEF DESCRIPTION OF THE DRAWINGS

The present invention will now be described in greater detail with reference to the preferred embodiments of the invention and the accompanying drawings, wherein.

Figure 3A:
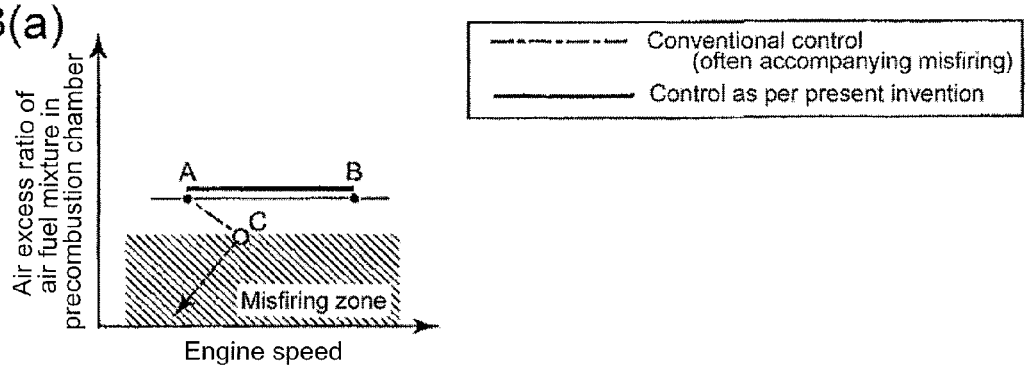
Figure 3B:
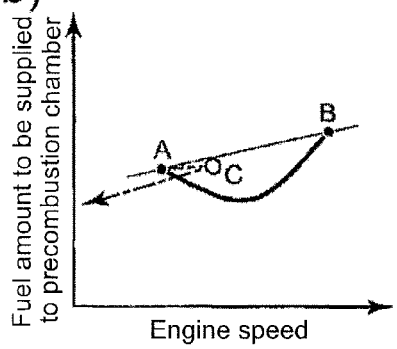
Figure 3D:
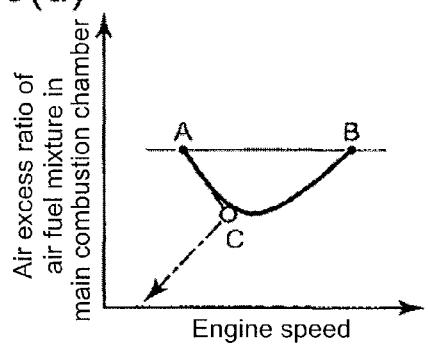
Figure 3C:
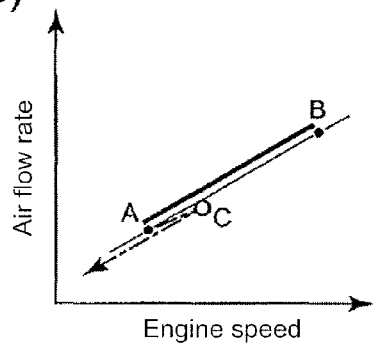
Figure 3E:
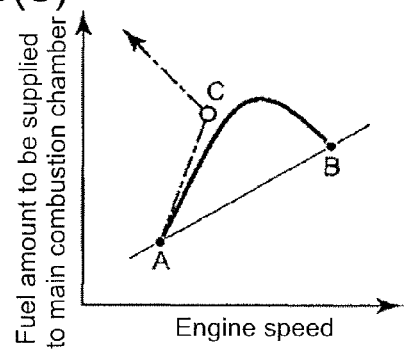
Figure 4:
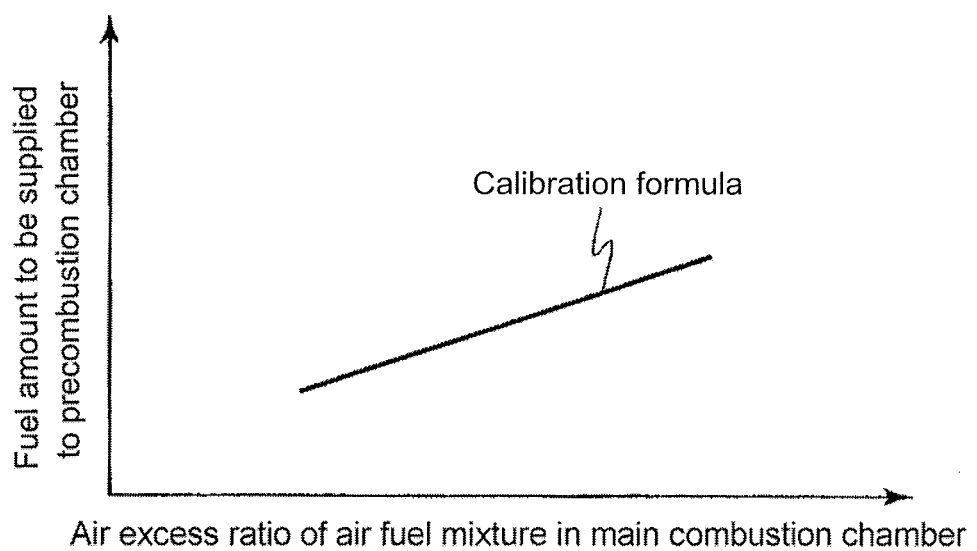
Figure 5:
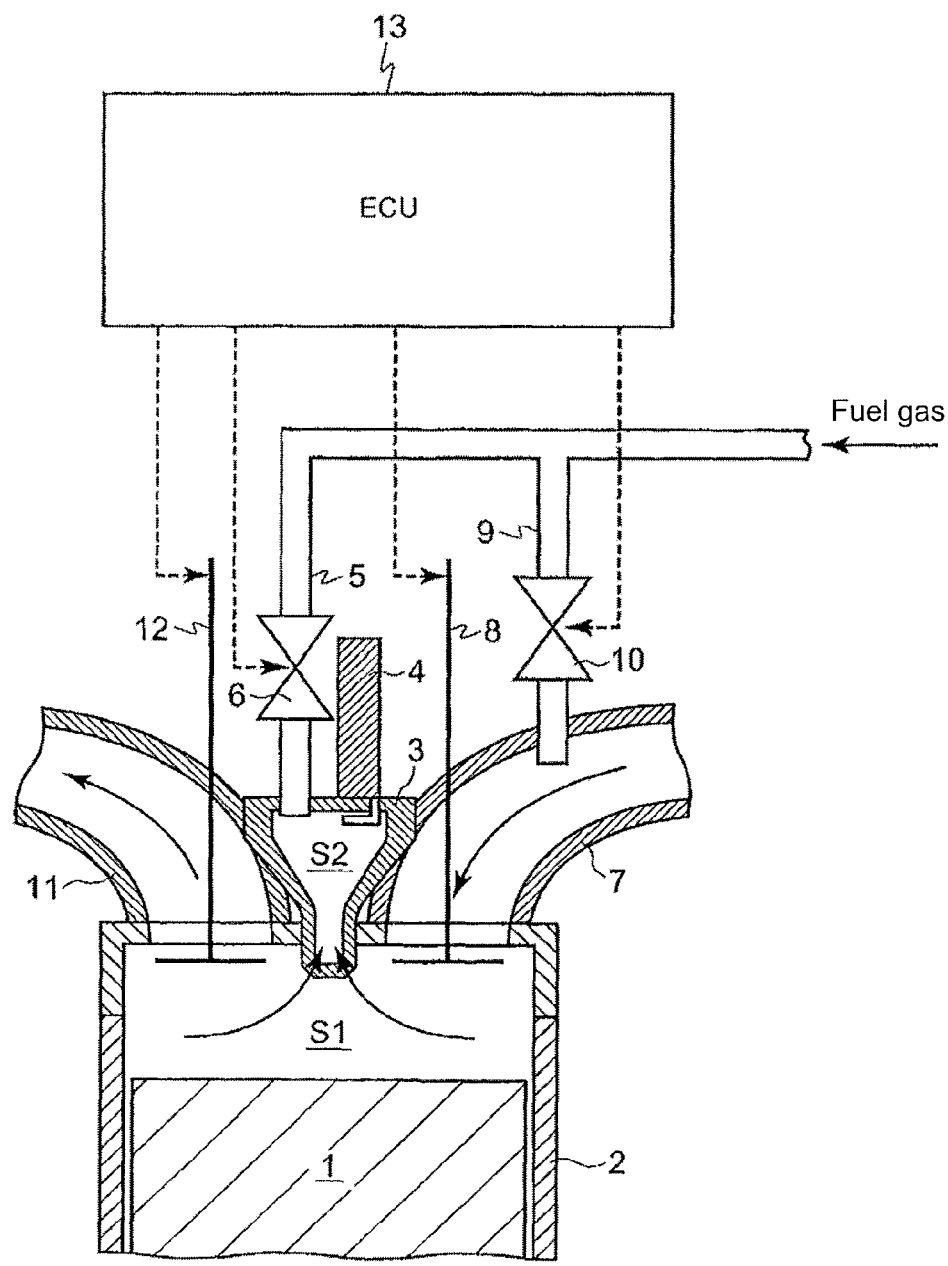
Figure 6A:
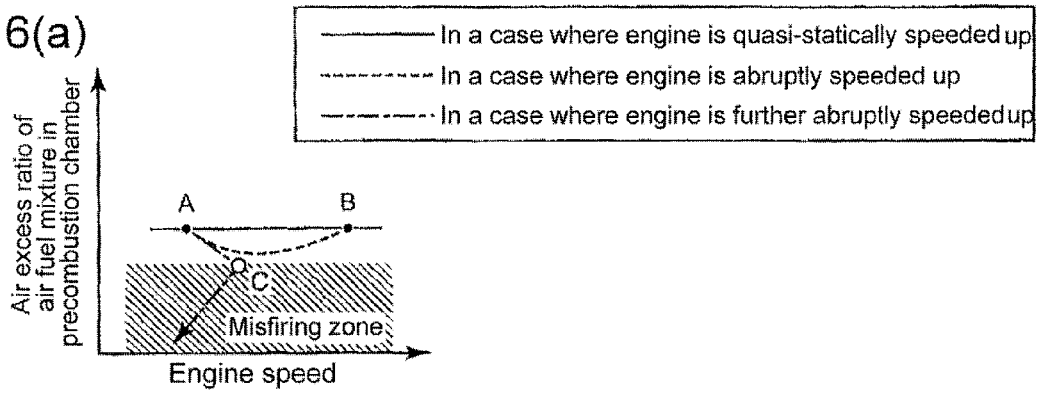
Figure 6B:
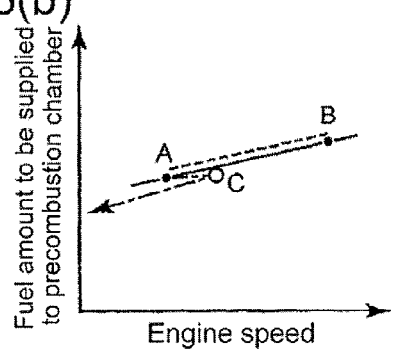
Figure 6C:
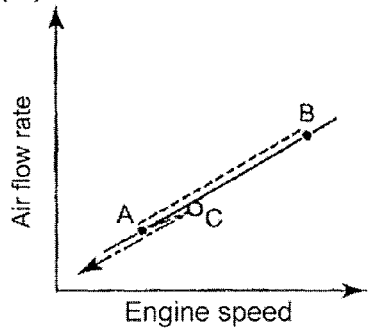
Figure 6D:
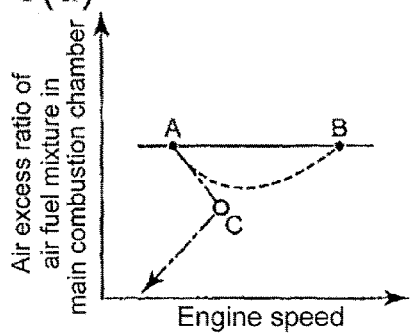
Figure 6E:
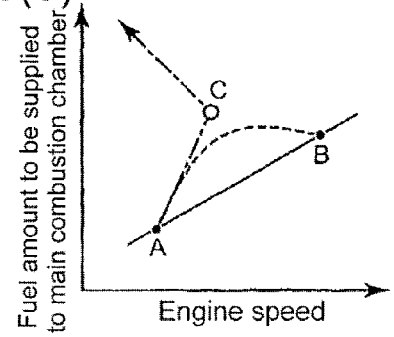

each of FIGS. 3(a) to 3(e) shows a graph depicting a relationship between the engine speed and a parameter regarding the control method for controlling the engine having a precombustion chamber, according to the present invention;

FIG. 3(a) shows the graph depicting the relationship between the engine speed and the air excess ratio of the air fuel mixture in the precombustion chamber;

FIG. 3(b) shows the graph depicting the relationship between the engine speed and the fuel amount of the air fuel mixture in the precombustion chamber;

FIG. 3(c) shows the graph depicting the relationship between the engine speed and the airflow rate;

FIG. 3(d) shows the graph depicting the relationship between the engine speed and the air excess ratio of the air fuel mixture in the main combustion chamber;

FIG. 3(e) shows the graph depicting the relationship between the engine speed and the fuel amount of the air fuel mixture in the main combustion chamber;

FIG. 4 shows a graph depicting a relationship between the air excess ratio of the air fuel mixture in the main combustion chamber and the fuel amount of the air fuel mixture in the precombustion chamber;

FIG. 5 shows an example of a conventional engine having a precombustion chamber;

each of FIGS. 6(a) to 6(e) shows a graph depicting a relationship between the engine speed and a parameter regarding the control method for controlling the engine having a precombustion chamber, according to the conventional technology;

FIG. 6(a) shows the graph depicting the relationship between the engine speed and the air excess ratio of the air fuel mixture in the precombustion chamber;

FIG. 6(b) shows the graph depicting the relationship between the engine speed and the fuel amount of the air fuel mixture in the precombustion chamber;

FIG. 6(c) shows the graph depicting the relationship between the engine speed and the airflow rate;

FIG. 6(d) shows the graph depicting the relationship between the engine speed and the air excess ratio of the air fuel mixture in the main combustion chamber;

FIG. 6(e) shows the graph depicting the relationship between the engine speed and the fuel amount of the air fuel mixture in the main combustion chamber.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
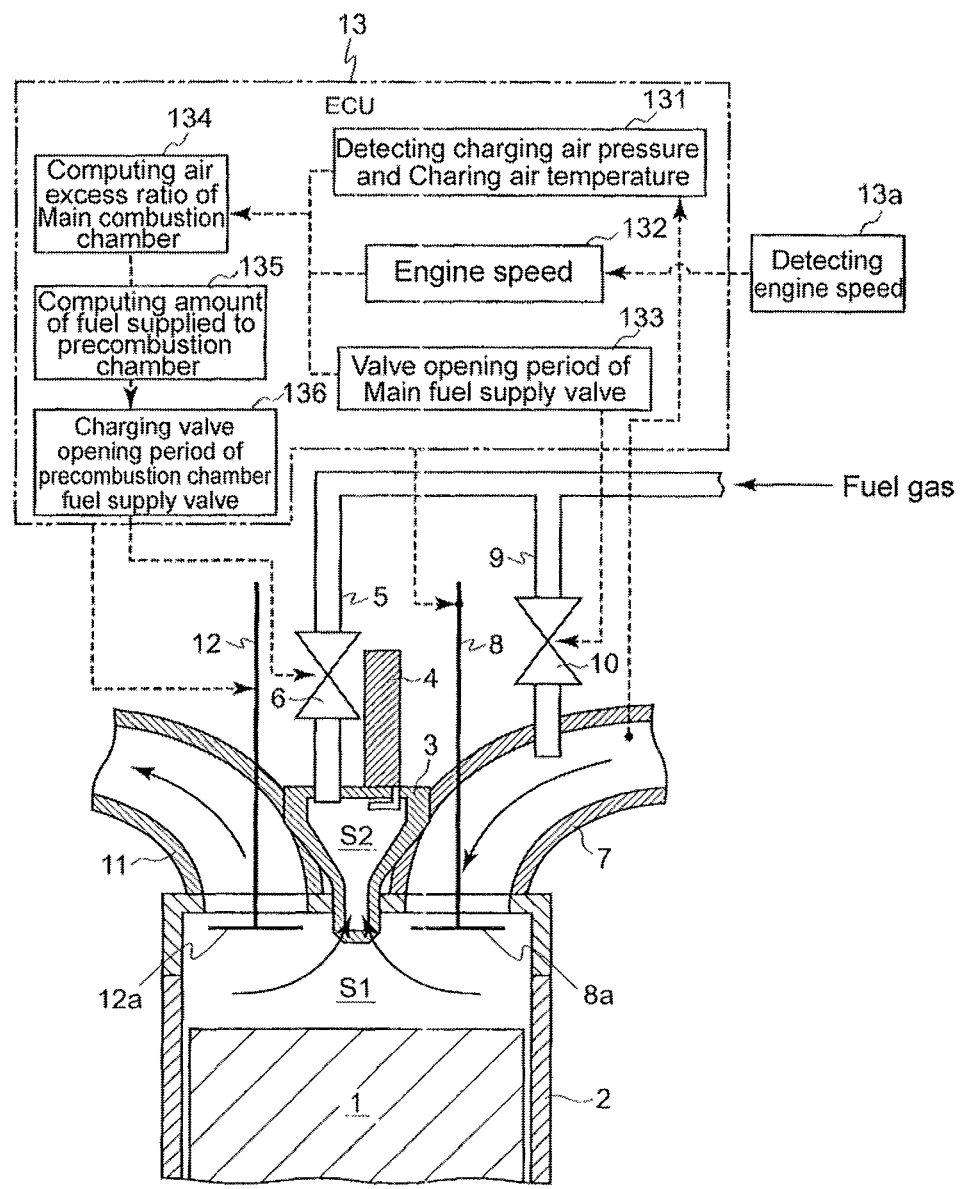
FIG. 1 explains a first embodiment of an engine having a precombustion chamber, the engine being used for applying a control method according to the present invention.

FIG. 1 shows the engine having a precombustion chamber, the engine being used for applying a control method according to the present invention. As shown in FIG. 1, over a piston 1 that moves upward and downward in a cylinder 2, a closed space demarcated by the upper surface of the piston and the inner periphery wall surface of the cylinder, namely, a main combustion chamber S1 is formed. At the middle part on the head side of a cylinder 2, a precombustion chamber-forming piece 3 of a tapered shape is arranged so that the tapered side protrudes toward the inside of the cylinder 2. In the precombustion chamber-forming piece 3, a precombustion chamber S2 is formed. On the upper side of the precombustion chamber-forming piece 3, a spark (ignition) plug 4 is provided for igniting the air fuel-gas mixture in the precombustion chamber S2. Further, over the precombustion chamber-forming piece 3, a fuel gas supply pipe 5 for feeding the fuel gas is provided. On a part way of the fuel gas supply pipe 5, a precombustion chamber fuel supply valve 6 for regulating the flow amount or the flow rate of the fuel is provided. The precombustion chamber fuel supply valve 6 is provided with an electromagnetic valve of a proportional control type so that the fuel gas supply can be continuously and smoothly performed.

Further, the space in the main combustion chamber on the head side of the cylinder 2 communicates with an air charging pipe 7 for charging fuel gas (or air fuel-gas mixture) into the main combustion chamber S1. A valve cone 8a of an air intake valve 8 is arranged at the boundary between the air charging pipe 7 and the cylinder 2, the boundary demarcating the space inside of the main combustion chamber S1 and the passage formed by the air charging pipe 7. The air intake valve 8 is pushed up or moves upward by the pushup force (restoring force) of springs (not shown) as well as is pushed down or moves downward by the thrust force via a cam mechanism (not shown) against the restoring force (biased force) of the springs. On a part way of the air charging pipe 7, a fuel gas supply pipe 9 for making fuel gas stream into the air charging pipe 7 is connected to the air charging pipe 7. In addition, on a part way of the fuel gas supply pipe 9, a main fuel supply valve 10 for regulating the amount or the flow rate of the fuel toward the main combustion chamber S1 is provided. The main fuel supply valve 10 is provided with an electromagnetic valve of a proportional control type so that the fuel gas supply can be continuously and smoothly performed.

Further, the fuel gas supply pipe 9 communicates with the precombustion chamber S2 as well as communicates with the fuel gas supply pipe 5 connected to the precombustion chamber S2; namely, a fuel gas pipe branches into two passages (i.e. the fuel gas supply pipes 9 and 5); thereby, the fuel gas supply pipe 9 supplies fuel to the main combustion chamber S1, while the fuel gas supply pipe 5 supplies fuel to the precombustion chamber S2.

The air fuel-gas mixture streaming into the main combustion chamber S1 through the air charging pipe 7 is compressed by the upward movement (i.e. compression stroke) of the piston 1, and burns in the main combustion chamber S1; then, the produced combustion gas pushes the piston 1 downward; and, the combustion gas is pressed by the upward movement (i.e. exhaust stroke) of the piston 1, and discharged through an exhaust (gas discharging) pipe that is connected to the head part (the upper part) of the cylinder 2, the boundary demarcating the space inside of the main combustion chamber S1 and the passage formed by the exhaust pipe 11. A valve cone 12a of an exhaust valve 12 is arranged at the boundary between the exhaust pipe 11 and the cylinder 2. As is the case with the air intake valve, the exhaust valve 12 pushed up or moves upward by the pushup force (restoring force) of springs (not shown) as well as is pushed down or moves downward by the thrust force via a cam mechanism (not shown) against the restoring force (biased force) of the springs.

While the piston 1 compresses the air fuel-gas mixture, a part of the air fuel-gas mixture streams into the precombustion chamber S2; in this embodiment, the formation of the air fuel-gas mixture in the precombustion chamber S2 is performed as follows.

In this embodiment, at least one pressure sensor and at least one temperature sensor are provided at the main air-intake pipe (not shown); by use of these sensors, a charging air pressure/temperature detecting means 131 provided in an engine control unit (ECU) 13 measures the charging air pressures and temperatures. Further, the engine is provided with an engine speed sensor 13a for detecting the engine speed; by use of this speed sensor, an engine speed detecting means 132 provided in the engine control unit (ECU) 13 measures the engine speed.

Further, a valve opening duration control means 133 for controlling the valve opening duration regarding the main fuel supply valve 10 is provided in EUC 13; namely, ECU 13 controls the valve opening/closing timing regarding the main fuel supply valve 10. Thus, ECU 13 controls the valve opening duration regarding the valve 10. Based on the charging air pressure, the charging air temperature, the engine speed and the valve opening duration regarding the main fuel supply valve 10, the air excess ratio (explained later) of the air fuel mixture supplied to the main combustion chamber S1 is computed by use of an air excess ratio computing means 134 that is provided in ECU 13.

Further, based on the computed air excess ratio of the air fuel mixture supplied to the main combustion chamber S1, the amount of the fuel gas to be supplied to the precombustion chamber S2 is computed by a precombustion chamber fuel computing means 135 that is provided in ECU 13. Further, a valve opening duration computing means 136 is provided in ECU 13 so as to compute the valve opening duration regarding the precombustion chamber fuel supply valve 6 in response to the amount of the fuel gas to be supplied to the precombustion chamber S2, the to-be-supplied amount being computed by the precombustion chamber fuel computing means 135. Thus, the opening duration of the precombustion chamber fuel supply valve 6 is controlled, and the fuel amount needed for forming appropriate air fuel mixture in the precombustion chamber is determined (regulated), the appropriate air fuel mixture being ignited in the precombustion chamber. In this control approach, the air fuel ratio of the air fuel mixture in the precombustion chamber is appropriately maintained at the time point of ignition.

More concretely, the computing method for computing the amount of the fuel to be supplied to the precombustion chamber is explained as follows.

Figure 2:
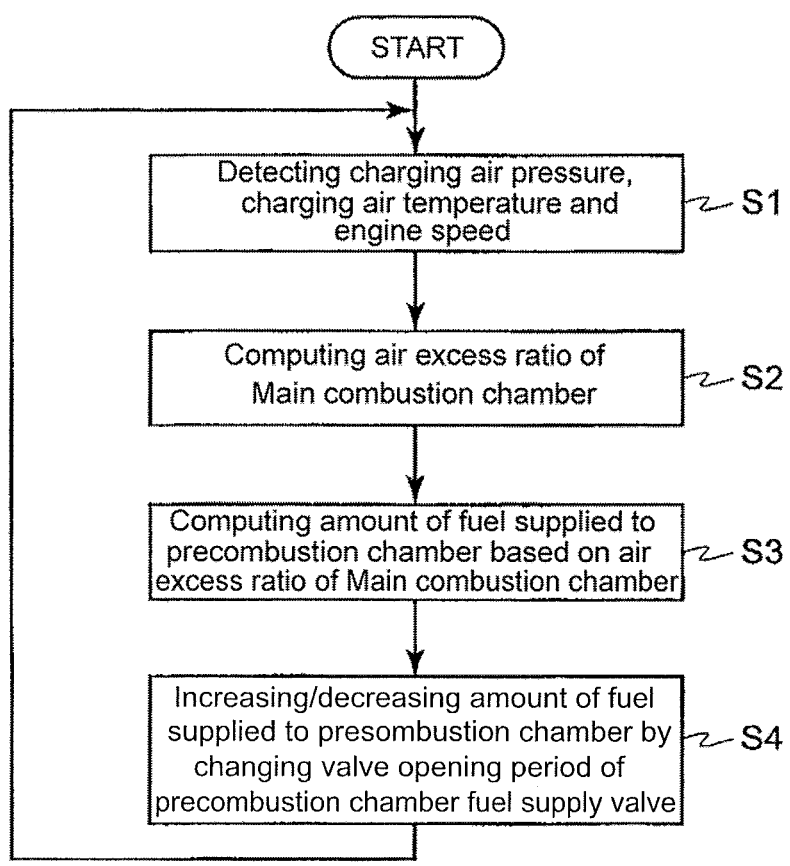
FIG. 2 shows a flow chart of the control method for controlling the engine having a precombustion chamber, according to the present invention.

FIG. 2 shows the flow chart of the control method for controlling the engine having a precombustion chamber, according to the present invention. As shown in FIG. 2, at first, in the step S1, the charging air pressure and the charging air temperature are detected (First Step) by use of the pressure sensor and the temperature sensor that are provided at the main air-intake pipe (not shown); thereby, it is preferable to measure the pressure and temperature repeatedly in a moment, and average the pressure values and the temperature values. Thus, the effects on the measurement data due to unfavorable conditions such as noises can be restrained. In the following step S2; the air excess ratio of the air fuel mixture supplied to the main combustion chamber is computed (Second Step). This air excess ratio is computed according to the formula below:

$$\lambda m = k \{ Ne(\text{rpm}) \cdot Ps(Pa) \} / \{ \theta v(s) \cdot Ts(K) \}$$

where k is constant; $\lambda m$ is the air excess ratio of the premixed air fuel mixture in the main chamber; Ne is the engine speed; Ps is the pressure of the charging air; $\theta v$ is the valve opening duration regarding the main fuel supply valve; and, Ts is the temperature of the charging air.

Incidentally, the engine speed and the airflow rate are directly proportional; therefore, the engine speed appears in the denominator (cf. FIG. 3(c)). In addition, the airflow rate is a mass flow rate in this embodiment.

In the above formula, the charging air pressure, the charging air temperature and the engine speed are the values detected in the step S1. Further, the opening duration regarding the main fuel supply valve 10 is a control command variable whose actual value is issued by the valve opening duration control means 133; thus, an already established value is used for the valve opening duration, the means 133 being provided in ECU. In addition, it is necessary to prepare, in advance, the relationship between the opening duration regarding the main fuel supply valve 10 and the mass flow rate of the fuel gas streaming into the main combustion S1 side, as the valve opening duration is made analogous use of for the mass flow rate of the fuel gas.

In the following step S3, based on the air excess ratio of the air fuel mixture streaming into the main combustion chamber, the appropriate fuel amount to be supplied to the precombustion chamber is computed (Third Step). In this computation, a calibration formula (a relational expression) as shown in FIG. 4 is used. The calibration formula in FIG. 4 is previously obtained based on the evaluation results of experiments; thereby, the calibration formula reflects the appropriate air excess ratios free from misfiring.

In the following step S4, an appropriate valve opening duration regarding the precombustion chamber fuel supply valve 6 is computed in response to the computed fuel amount to be supplied to the precombustion chamber S2 via the valve 6; thereby, a relational expression obtained from experiments is also used.

When the precombustion chamber fuel supply valve 6 is operated with the valve opening duration computed as described above, appropriate air excess ratios of the air fuel mixture ignited in the precombustion chamber are obtained.

During the engine operation, ECU always and continuously repeats the processes of the step S1 to the step S4; thus, the air excess ratio of the air fuel mixture in the precombustion chamber is optimally controlled; thereby, high control-responsiveness can be also achieved.

For instance, when the fuel amount toward the precombustion chamber is decreased while the fuel amount toward the main combustion chamber is transiently increased and the processes of the step S1 to the step S4 are continuously performed, then the relationship between the engine speed and the fuel amount of the air fuel mixture in the precombustion chamber forms a curve of an arc shape protruding downward, as shown in FIG. 3(b); thereby, the relationship between the engine speed and the air excess ratio of the air fuel mixture to be supplied to the precombustion chamber forms a flat line parallel to the axis of the engine speed, as shown in FIG. 3(a). Thus, the air excess ratio changes along the flat line in this embodiment, being prevented from entering the misfiring zone.

According to this embodiment, in the control method for controlling the engine having a precombustion chamber, the engine operation conditions are measured in time intervals of a short time span; the air fuel ratio of the air fuel mixture in the precombustion chamber is regulated so that the air fuel ratio is kept at an appropriate level; thus, the misfiring that may possibly occur in the precombustion chamber can be surely prevented. More concretely, the valve opening duration regarding the main fuel supply valve 10 is a control command variable which actual value is issued by the valve opening duration control means 133 provided in ECU; and, an already established value is (or prescribed values are) used for the valve opening duration regarding the valve 10. As a result, by a simple manner where the charging air pressure, the charging air temperature and the engine speed are detected (First Step) by use of the charging air pressure/temperature sensors, with reference to a previously arranged calibration formula that is a relational expression between the air excess ratio of the air fuel mixture in the main combustion chamber and the fuel amount of the air fuel mixture in the precombustion chamber, the engine misfiring can be prevented.

Thus far, the embodiments according to the present invention have been explained; it goes without saying that the present invention is not limited to the above-described embodiment, and there can be other various modes under the condition that the modes keep the features of the present invention.

In the above-described embodiment where a fuel supply pipe branches into two pipes: the fuel gas supply pipe 9 toward the main combustion chamber S1 and the fuel gas supply pipe 5 toward the precombustion chamber S2; however, the present invention is not limited to this embodiment. For instance, apart from the branched fuel supply pipes of this embodiment, the fuel gas supply pipe 9 and the fuel gas supply pipe 5 can be arranged independently each other; thereby, the control of the main fuel supply valve 10 and the control of the precombustion chamber fuel supply valve 6 can be independently performed at the same time.

Industrial Applicability

According to the present invention, in the control method for controlling the engine of a precombustion chamber type, potential misfiring in the precombustion chamber can be surely prevented. The present invention can be applied to, for instance, various products such as a generator set, a vehicle, an aircraft, a ship and so on; thereby, in each product, the engine of a precombustion chamber type is installed.

The invention claimed is:

1. A control method for controlling an engine of a precombustion chamber type, the engine comprising:
   a main combustion chamber into which air fuel-gas mixture is supplied via an air charging pipe;
   a precombustion chamber into which fuel gas is supplied;
   a precombustion chamber fuel supply valve configured to regulate an amount of the fuel gas which is supplied into the precombustion chamber;
   a spark plug configured to ignite the air fuel-gas mixture in the precombustion chamber, the spark plug being provided on the upper side of the precombustion chamber;
   a main fuel supply valve configured to supply fuel gas to a part way of the air charging pipe so as to supply the fuel gas to the main combustion chamber; and an ECU including:
   a charging air pressure/temperature detecting unit configured to detect pressure and temperature of charging air supplied into the air charging pipe;
   an engine speed detecting unit configured to detect engine speed; and
   a valve opening duration control unit configured to determine an opening duration of the main fuel supply valve, the control method comprising:
   a first step for detecting a charging air pressure, a charging air temperature and an engine speed;
   a second step for computing an air excess ratio of the air fuel-gas mixture in the main combustion chamber by use of a following formula based on detected results of the charging air pressure, the charging air temperature and the engine speed;
   a third step for computing the amount of the fuel gas in the precombustion chamber from the air excess ratio in the main combustion chamber computed in the second step by use of a relational expression, the relational expression being predetermined reflecting a relationship between the air excess ratio in the main combustion chamber and the amount of the fuel gas in the precombustion chamber so as to obtain an appropriate air fuel ratio in the precombustion chamber free from a misfiring in response to the air excess ratio in the main combustion chamber;
   a fourth step for increasing or decreasing the amount of the fuel gas in the precombustion chamber based on a valve opening duration of the precombustion chamber fuel supply valve, the valve opening duration of the precombustion chamber fuel supply valve being computed from the amount of the fuel gas in the precombustion chamber computed in the third step according to the following equation:

$$\lambda m = k \{Ne(rpm) \cdot Ps(Pa)\} / \{\theta v(s) \cdot Ts(K)\}$$

where k is a constant; $\lambda m$ is the air excess ratio of air fuel-gas mixture in the main chamber; Ne is engine speed; Ps is a pressure of a charging air; $\theta v$ is a valve opening duration regarding a main fuel supply valve; and, Ts is a temperature of a charging air.

2. The control method for controlling an engine of a precombustion chamber type according to claim 1, wherein the ECU is configured to control an opening of the precombustion chamber fuel supply valve so as to decrease the amount of the fuel gas to be supplied to the precombustion chamber while the amount of the fuel to be supplied to the main combustion chamber is transiently increased.

3. The control method for controlling an engine of a precombustion chamber type according to claim 1, wherein the processes of the first to the fourth steps are continuously and repeatedly performed.

4. An engine of a precombustion chamber type comprising:
   a main combustion chamber into which air fuel-gas mixture is supplied via an air charging pipe;
   a precombustion chamber into which fuel gas is supplied;
   a precombustion chamber fuel supply valve configured to regulate amount of the fuel gas which is supplied into the precombustion chamber;
   a spark plug configured to ignite the air fuel-gas mixture in the precombustion chamber, the spark plug being provided on the upper side of the precombustion chamber;
   a main fuel supply valve configured to supply fuel gas to the air charging pipe so as to supply the fuel gas to the main combustion chamber; and an ECU including:
   a charging air pressure/temperature detecting unit configured to detect pressure and temperature of charging air which is an air supplied into the air charging pipe;
   an engine speed detecting unit configured to detect engine speed;

a valve opening duration control unit configured to determine an opening duration regarding the main fuel supply valve;

a main combustion chamber air excess ratio computing unit configured to compute an air excess ratio of the air fuel gas mixture in the main combustion chamber by use of a following formula based on results of the charging air pressure, the charging air temperature detected by the charging air pressure/temperature detecting unit and result of the engine speed detected by the engine speed detecting unit;

a precombustion chamber fuel amount computing unit configured to compute the amount of the fuel gas in the precombustion chamber from the air excess ratio in the main combustion chamber computed by the main combustion chamber air excess ratio computing unit by use of a relational expression, the relational expression being predetermined reflecting a relationship between the air excess ratio in the main combustion chamber and the amount of the fuel gas in the precombustion chamber so as to obtain an appropriate air fuel ratio in the precombustion chamber free from misfiring in response to the air excess ratio in the main combustion chamber;

a precombustion chamber fuel supply valve controlling unit configured to control the precombustion chamber fuel supply valve based on a valve opening duration of the precombustion chamber fuel supply valve, the valve opening duration of the precombustion chamber fuel supply valve being computed from the amount of the fuel gas in the precombustion chamber computed by the precombustion chamber fuel amount computing unit according to the following equation:

$$\lambda m = k\{Ne(\text{rpm}) \cdot Ps(Pa)\}/\{\theta v(s) \cdot Ts(K)\}$$

where k is a constant; $\lambda m$ is the air excess ratio of air fuel-gas mixture in the main chamber; Ne is engine speed; Ps is a pressure of a charging air; $\theta v$ is a valve opening duration regarding a main fuel supply valve; and, Ts is a temperature of a charging air.

* * * * *